(12) United States Patent
Han

(10) Patent No.: US 10,742,775 B2
(45) Date of Patent: Aug. 11, 2020

(54) SUPPORTING INTERNET PROTOCOL VERSION 4 (IPV4) EXTENSION HEADERS

(71) Applicant: Futurewei Technologies, Inc., Plano, TX (US)

(72) Inventor: Lin Han, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/983,670

(22) Filed: May 18, 2018

(65) Prior Publication Data

US 2019/0020737 A1 Jan. 17, 2019

Related U.S. Application Data

(60) Provisional application No. 62/531,240, filed on Jul. 11, 2017.

(51) Int. Cl.
| | |
|---|---|
| *H04L 12/801* | (2013.01) |
| *H04L 29/06* | (2006.01) |
| *H04L 29/08* | (2006.01) |

(52) U.S. Cl.
CPC ............ *H04L 69/161* (2013.01); *H04L 47/17* (2013.01); *H04L 47/18* (2013.01); *H04L 69/166* (2013.01);
(Continued)

(58) Field of Classification Search
CPC ... H04L 29/02; H04L 29/06; H04L 29/06006; H04L 29/06013; H04L 29/06095; H04L 29/06102; H04L 29/06136; H04L 29/06142; H04L 29/06149; H04L 29/06156; H04L 29/0653; H04L 29/06544; H04L 29/08; H04L 29/08009; H04L 29/08036; H04L 47/17; H04L 47/18; H04L 69/02; H04L 69/03; H04L 69/16;
(Continued)

(56) References Cited

U.S. PATENT DOCUMENTS

2005/0068981 A1* 3/2005 Park ..................... H04L 69/16
370/466
2011/0103260 A1 5/2011 Jeyatharan et al.
(Continued)

FOREIGN PATENT DOCUMENTS

| CN | 101030935 A | 9/2007 | |
|---|---|---|---|
| CN | 101030935 B * | 9/2007 | ............. H04L 29/06 |
| WO | 2012089107 A1 | 7/2012 | |

OTHER PUBLICATIONS

Krishnan, S., et al., "An uniform format for IPv6 extension headers," draft-krishnan-ipv6-exthdr-05, Oct. 3, 2008, 9 pages.*
(Continued)

*Primary Examiner* — Timothy J Weidner
(74) *Attorney, Agent, or Firm* — Conley Rose, P.C.

(57) ABSTRACT

A method implemented by a network element (NE) comprises receiving, by a receiver of the NE, an Internet Protocol (IP) version 4 (IPv4) packet from another NE, wherein the IPv4 packet comprises an IPv4 header, an extension header, and upper layer data, wherein the IPv4 header comprises a protocol number associated with the extension header, and wherein the IPv4 packet comprises a total length of the extension header, and processing, by a processor coupled to the receiver, the IPv4 packet based on the total length of the extension header.

18 Claims, 11 Drawing Sheets

(52) U.S. Cl.
CPC ............ *H04L 69/167* (2013.01); *H04L 69/22* (2013.01); *H04L 69/26* (2013.01); *H04L 69/325* (2013.01)

(58) Field of Classification Search
CPC ... H04L 69/161; H04L 69/166; H04L 69/167; H04L 69/168; H04L 69/169; H04L 69/22; H04L 69/26; H04L 69/30; H04L 69/32; H04L 69/325
See application file for complete search history.

(56) References Cited

U.S. PATENT DOCUMENTS

| | | | |
|---|---|---|---|
| 2013/0039278 A1* | 2/2013 | Bouazizi | H04L 65/4076 370/328 |
| 2014/0119387 A1* | 5/2014 | Jiang | H04L 69/161 370/474 |

OTHER PUBLICATIONS

Foreign Communication From a Counterpart Application, PCT Application No. PCT/CN2018/094948, English Translation of International Search Report dated Sep. 25, 2018, 8 pages.*

Deering, et al., "Internet Protocol, Version 6 (IPv6) Specification," draft-ietf-6man-rfc2460bis-13, May 19, 2017, 45 pages.
"Internet Protocol, DARPA Internet Program Protocol Specificatin," RFC 791, Sep. 1981, 50 pages.
Deering, et al., "Internet Protocol, Version 6 (IPv6) Specification," RFC 2460, Dec. 1998, 39 pages.
Abley, et al., "Deprecation of Type 0 Routing Headers in IPv6," RFC 5095, Dec. 2007, 7 pages.
Perkins, Ed., et al., "Mobility Support in IPv6," RFC 6275, Jul. 2011, 169 pages.
Mogul, et al., "IP MTU Discovery Options," RFC 1063, Jul. 1988, 11 pages.
Wang, "EIP: The Extended Internet Protocol A Framework for Maintaining Backward Compatibility," RFC 1385, Nov. 1992, 17 pages.
Deering, et al., "Internet Protocol, Version 6 (IPv6) Specification," RFC 8200, Jul. 2017, 42 pages.
Machine Translation and Abstract of Chinese Publication No. CN101030935, Sep. 5, 2007, 9 pages.
Machine Translation and Abstract of International Publication No. WO2012089107, Jul. 5, 2012, 19 pages.

* cited by examiner

900

903

MTU: Maximum Trasmit Unit in Layer 2.
hdr_len: Header length in IPv4 header = IHL*4
ehs_len: Total length of EHs
total_len: Total length in IPv4 header
data_len: The upper layer datagram length
data_frag_len: The fragmented upper layer datagram length
MF: More fragments bits

906 data_len = total_len − (hdr_len + ehs_len)
data_frag_len = (MTU − (hdr_len + ehs_len)
Total fragments n
n = data_len/data_frag_len (if data_len is divisible by data_frag_len);
Or n = data_len/data_frag_len + 1 (if data_len is not divisible by data_frag_len);

1st fragment: total_len = MTU; MF = 1; offset = 0
2nd fragment: total_len = MTU; MF = 1; offset = data_frag_len/8
3rd fragment: total_len = MTU; MF = 1; offset = 2*data_frag_len/8
...
nth fragment: total_len = (hdr_len + ehs_len) + [data_len − (n−1)*data_frag_len] ;
　　　　　　　　　　　　MF = 0; offset = (n−1)* data_frag_len/8

START

1003 — Receive an IPv4 packet from another NE, wherein the IPv4 packet comprises an Internet Protocol (IP) version 4 (IPv4) header, an extension header, and upper layer data, wherein the IPv4 header comprises a protocol number associated with the extension header, and wherein the IPv4 packet comprises a length of the extension header 1006 — Process the IPv4 packet based on the length of the extension header

END

START

1103 — Obtain an Internet Protocol (IP) version 4 (IPv4) packet, wherein the IPv4 packet comprises an IPv4 header, a plurality of extension headers, and upper layer data, wherein the IPv4 header comprises a protocol number associated with a first extension header of the plurality of extension headers, and wherein the packet comprises a length of the plurality of extension headers 1106 — Transmit the IPv4 packet to another NE

END

1203 — Receive an Internet Protocol (IP) version 4 (IPv4) packet, wherein the IPv4 packet comprises an IPv4 header, an extension header, and upper layer data, wherein the IPv4 header comprises a protocol number associated with the extension header, and wherein the IPv4 packet comprises a length of the extension header 1206 — Transmit the IPv4 packet to another NE

FIG. 12

SUPPORTING INTERNET PROTOCOL VERSION 4 (IPV4) EXTENSION HEADERS

CROSS-REFERENCE TO RELATED APPLICATIONS

The present application claims benefit of U.S. Provisional Patent Application No. 62/531,240 filed Jul. 11, 2017 by Lin Han. and entitled "Supporting Internet Protocol Version 4 (IPv4) Extension Headers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version 4 (IPv4) is the fourth version of the IP, and IPv4 is one of the core protocols of standards-based internetworking methods on the Internet. IPv4 is a connectionless protocol for use in packet-switched networks that operates on a best effort delivery mode. The best effort delivery model does not guarantee delivery or assure proper sequencing or avoidance of duplicate delivery. These aspects, including data integrity, are addressed by an upper layer transport protocol, such as the Transmission Control Protocol (TCP) or User Datagram Protocol (UDP). IPv4 is still used to route most of the Internet traffic today, despite the ongoing deployment of a successor protocol, IP version 6 (IPv6).

SUMMARY

According to one aspect of the present disclosure, there is provided a method implemented by a network element (NE). The method comprises receiving, by a receiver of the NE, an Internet Protocol (IP) version 4 (IPv4) packet from another NE, wherein the IPv4 packet comprises an IPv4 header, an extension header, and upper layer data, wherein the IPv4 header comprises a protocol number associated with the extension header, and wherein the IPv4 packet comprises a total length of the extension header, and processing, by a processor coupled to the receiver, the IPv4 packet based on the total length of the extension header.

Optionally, in any of the preceding aspects, another implementation of the aspect provides that a protocol field in the IPv4 header comprises the protocol number associated with the extension header.

Optionally, in any of the preceding aspects, another implementation of the aspect provides that the IPv4 packet further comprises a payload.

Optionally, in any of the preceding aspects, another implementation of the aspect provides that wherein processing, by the processor, the IPv4 packet based on the total length of the extension header further comprises determining a start point of the upper layer data of the IPv4 packet based on a length of the IPv4 header and the length of the extension header, wherein the upper layer data comprises the upper layer protocol header and a payload.

Optionally, in any of the preceding aspects, another implementation of the aspect provides that the IPv4 packet comprises a plurality of extension headers, and wherein each of the extension headers comprises a protocol number for a next extension header.

Optionally, in any of the preceding aspects, another implementation of the aspect provides that the extension header is at least one of a hop-by-hop extension header or a destination extension header.

Optionally, in any of the preceding aspects, another implementation of the aspect provides that an options field of the IPv4 header comprises the total length of the extension header.

Optionally, in any of the preceding aspects, another implementation of the aspect provides that another extension header included in the packet comprises a total length of both the extension header and the other extension header.

According to one aspect of the present disclosure, there is provided a NE, comprising a memory storage comprising instructions, and one or more processors in communication with the memory storage, wherein the one or more processors execute the instructions to obtain, by a processor of the NE, an Internet Protocol (IP) version 4 (IPv4) packet, wherein the IPv4 packet comprises an IPv4 header, a plurality of extension headers, and upper layer data, wherein the IPv4 header comprises a protocol number associated with a first extension header of the plurality of extension headers, and wherein the packet comprises a length of the plurality of extension headers, and transmit, by a transmitter coupled to the NE, the IPv4 packet to another NE.

Optionally, in any of the preceding aspects, another implementation of the aspect provides that the one or more processors execute the instructions to encapsulate the IPv4 packet to include the IPv4 header and the plurality of extension headers, and wherein the packet further comprises a payload.

Optionally, in any of the preceding aspects, another implementation of the aspect provides that a protocol field in the IPv4 header comprises the protocol number associated with the first extension header.

Optionally, in any of the preceding aspects, another implementation of the aspect provides that the protocol number associated with the first extension header identifies a type of the first extension header.

Optionally, in any of the preceding aspects, another implementation of the aspect provides that the first extension header comprises a second protocol number associated with a second extension header of the plurality of extension head.

Optionally, in any of the preceding aspects, another implementation of the aspect provides that the options field of the IPv4 header comprises the length of the extension header.

Optionally, in any of the preceding aspects, another implementation of the aspect provides that the first extension header comprises the length of the plurality of extension headers.

According to one aspect of the present disclosure, there is provided a NE, comprising a receiver configured to receive an Internet Protocol (IP) version 4 (IPv4) packet, wherein the IPv4 packet comprises an IPv4 header, an extension header, and upper layer data, wherein the IPv4 header comprises a protocol number associated with the extension header, and wherein the IPv4 packet comprises a length of the extension header, and a transmitter coupled to the processor and configured to transmit the IPv4 packet to another NE.

Optionally, in any of the preceding aspects, another implementation of the aspect provides that a protocol field in the IPv4 header comprises the protocol number associated with the extension header, and wherein the protocol number identifies a type of the extension header.

Optionally, in any of the preceding aspects, another implementation of the aspect provides that the packet comprises a plurality of extension headers, wherein the IPv4 packet comprises a total length of the plurality of extension headers, and wherein each of the extension headers comprises a protocol number for a next extension header.

Optionally, in any of the preceding aspects, another implementation of the aspect provides that an options field of the IPv4 header comprises the length of the extension header.

Optionally, in any of the preceding aspects, another implementation of the aspect provides that another extension header included in the IPv4 packet comprises a length of both the extension header and the other extension header.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 shows an example of calculations 900 used to determine a fragment offset that may be included in an IPv4 header for each of the fragments according to various embodiments of the disclosure.

FIG. 10 is a flowchart illustrating a method for processing an IPv4 packet with extension headers according to various embodiments of the disclosure.

FIG. 11 is a flowchart illustrating a method for generating an IPv4 packet with extension headers according to various embodiments of the disclosure.

FIG. 12 is a flowchart illustrating a method for forwarding an IPv4 packet with extension headers according to various embodiments of the disclosure

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A packet transmitted across a network implementing IPv4 (also referred to herein as an IPv4 packet) consists of a header section and a data section. The header section of the IPv4 packet typically only includes the IPv4 header. The data section of the IPv4 packet typically includes an upper layer protocol header, such as a TCP or UDP header, and a payload of the packet. Therefore, typical IPv4 packets do not have much capacity to carry additional control information that may be helpful for certain applications.

Embodiments of the present disclosure are directed to adding extension headers to the IPv4 packet that do not add to the length of the IPv4 header. The extension headers may carry additional control information that may be used to process the IPv4 packet at each hop on a path and/or at the destination host. A total length of the extension headers may be carried in an options field of the IPv4 packet or in a designated extension header included in the IPv4 packet between the IPv4 header and the upper layer protocol header. A node on a path or a destination host may use the total length of the extension headers and a length of the IPv4 header to process the IPv4 packet.

Figure 1:
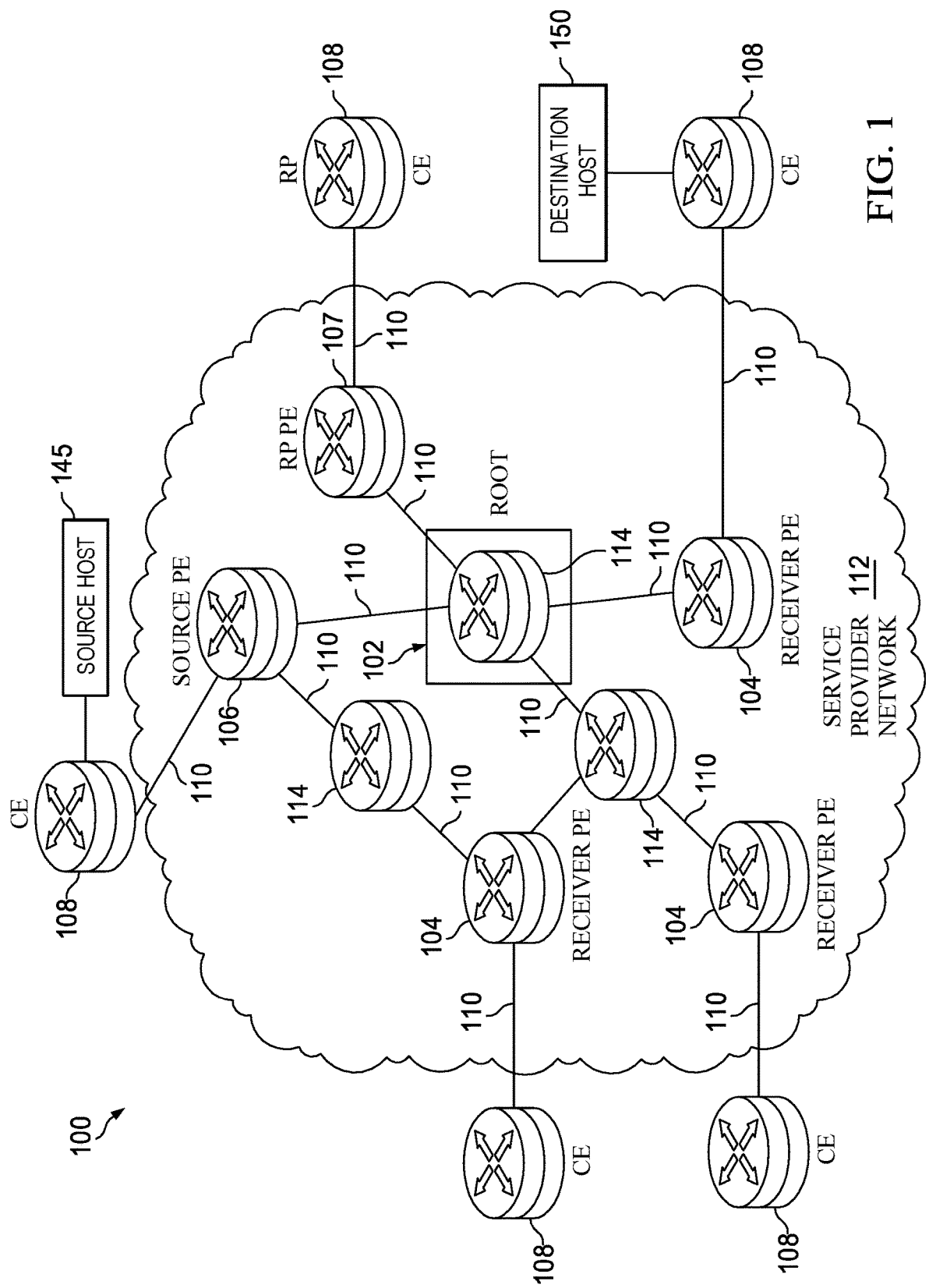
FIG. 1 illustrates an embodiment of a network configured to support IPv4 extension headers.

FIG. 1 illustrates an embodiment of a network 100 configured to support IPv4 extension headers. The network 100 may be an IP packet-switched network in which IPv4 is implemented. The network 100 generally comprises a plurality of network elements NEs (e.g., label switch routers (LSRs)), for example a root NE 102, one or more receiver provider edge (PE) NE 104, one or more source PE NE 106, one or more rendezvous point (RP) PE NE 107, one or more customer edge (CE) NE 108, and one or more core NE 114. Additionally, the NEs (e.g., the root NE 102, the receiver PE NEs 104, the source PE NEs 106, the CE NEs 108, the core NEs 114, etc.) may be interconnected and in data communication with each other via one or more links 110 (e.g., a wireless link or a wired link). Further, the network 100 is configured to employ various different upper layer protocols, such as TCP, UDP, internet group management protocol (IGMP), internet control message protocol (ICMP), open shortest path first (OSPF) protocol, stream control transmission protocol, and/or any suitable routing protocol as would be appreciated by one of ordinary skill in the art upon viewing this disclosure.

The NEs (e.g., the root NE 102, the receiver PE NEs 104, the source PE NEs 106, the RF PE NEs 107, the CE NEs 108, the core NEs 114, etc.) may each be a device configured to encapsulate, forward, and decapsulate IPv4 packets within a network and/or between multiple networks. For example, a core NE 114 may be a router within a service provider network 112 and may be configured to form a portion of a backbone or core for the service provider network 112. A receiver PE NE 104 and/or a source PE NE 106 may be a router within the service provider network 112 which may be configured to form an interface between the service provider network 112 and one or more CE NEs 108.

A source PE NE 106 may be a PE router where a multicast source (e.g., a host) is located on or behind a CE NE 108. Referring to the example embodiment of FIG. 1, the network 100 comprises the root NE 102 in data communication with the receiver PE NEs 104, the source PE NEs 106, and the core NEs 114. Additionally, the PE NEs (e.g., the receiver PE NEs 104 and the source PE NEs 106) are each in data communication with a CE NE 108. Additionally, each of the NEs (e.g., the root NE 102, the receiver PE NEs 104, the source PE NEs 106, the RF PE NEs 107, the CE NEs 108, the core NEs 114, etc.) may be configured to employ a routing table, forwarding table, network table, or the like, to control and/or direct data traffic for a given network. For example, each of the routers may generate or establish a routing table to coordinate data communication with other NEs within the network 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure.

For example, a source host 145 may be coupled to the source PE NE 106, and a destination host 150 may be coupled to the CE NE 108. In some embodiments, the source host 145 may send IPv4 packets along a path from the source PE NE 106, core NE 114, receiver PE NE 104, and CE NE 108. As should be appreciated, other NEs may be included in this path, and alternative paths connecting the source host 145 and the destination host 150 may be used to transmit the IPv4 packets.

Each of the NEs (e.g., the root NE 102, the receiver PE NEs 104, the source PE NEs 106, the RF PE NEs 107, the CE NEs 108, the core NEs 114, etc.) may be configured to encapsulate, forward, and decapsulate IPv4 packets. NEs in a network implementing IPv4 (and not implementing IPv6) are typically not configured to add extension headers to a packet. This is because the length of an IPv4 header is fixed at 20 bytes and cannot be extended. IPv4 headers include an options field in which one or more options may be presented in the IPv4 header. The options are optional parameters that configure different behaviors for a packet, such as a method to be used during source routing, control and probing facilities, and experimental features. However, the options field in an IPv4 header is limited to 40 bytes. Therefore, there is not enough space in an IPv4 header to add options having control information for packets that are sent from complicated applications. For example, there is not enough space in an IPv4 header to signal information that involves special delivery parameters at each hop on a path to a destination, mobility support, or source routing.

According to various embodiments of the disclosure, the NEs (e.g., the root NE 102, the receiver PE NEs 104, the source PE NEs 106, the RF PE NEs 107, the CE NEs 108, the core NEs 114, etc.) shown in FIG. 1 are configured to add one or more extension headers to a packet that includes additional control information that is used to process and forward packets. In an embodiment, an IPv4 packet transmitted across the NEs (e.g., the root NE 102, the receiver PE NEs 104, the source PE NEs 106, the RF PE NEs 107, the CE NEs 108, the core NEs 114, etc.) shown in FIG. 1 include an IPv4 header, one or more extension headers, an upper layer protocol header, and a payload. The control information for transmitting the IPv4 packet is subdivided into the mandatory IPv4 header with a fixed size and the one or more extension headers having variable sizes. An extension header contains supplementary information used by NEs (e.g., the root NE 102, the receiver PE NEs 104, the source PE NEs 106, the RF PE NEs 107, the CE NEs 108, the core NEs 114, etc.) to decide how to direct or process the IPv4 packet.

Figure 2:
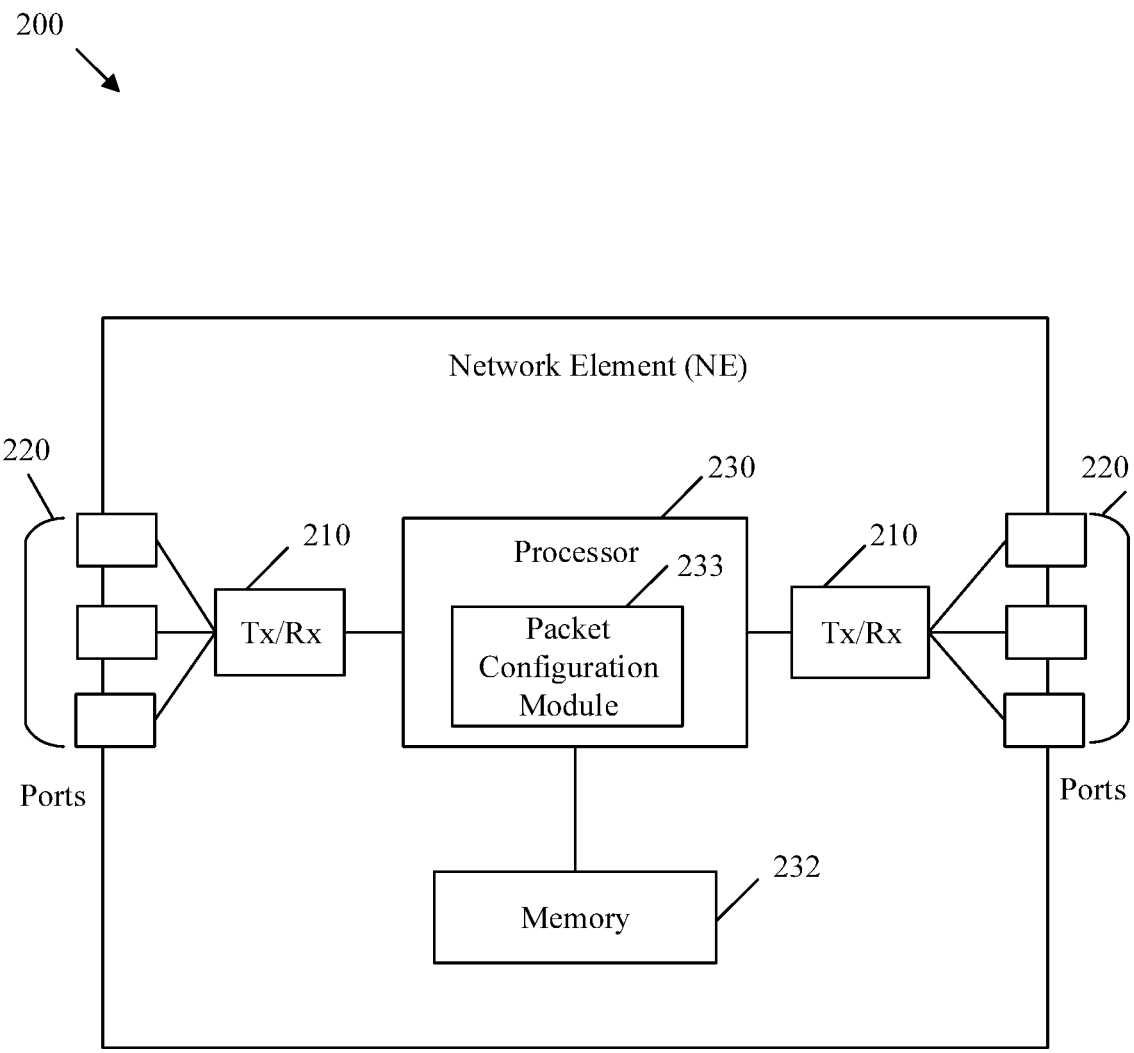
FIG. 2 is a schematic diagram of a NE suitable for supporting the use of extension headers in IPv4 packets as disclosed herein.

FIG. 2 is a schematic diagram of a NE 200 suitable for supporting the use of extension headers in IPv4 packets as disclosed herein. In other words, the NE 200 is configured to encapsulate, forward, decapsulate, and process the IPv4 packets with extension headers as described herein. NE 200 of FIG. 2 is similar to the NEs (e.g., NEs 102, 104, 106, 107, 108, or 114, etc.) of FIG. 1. In an embodiment, the NE 200 is a switch, router, gateway, virtual machine (VM), or other device used in the transportation of packets or information across a network. Hereinafter, NE 200 may refer to any of NEs 102, 104, 106, 107, 108, or 114 described with reference to FIG. 1.

NE 200 comprises ports 220, transceiver units (Tx/Rx) 210, a processor 230, and a memory 232. The processor 230 comprises a packet configuration module 233. Ports 220 are coupled to Tx/Rx 210, which may be transmitters, receivers, or combinations thereof. The Tx/Rx 210 may transmit and receive data via the ports 220. Processor 230 is configured to process data. Memory 232 is configured to store data and instructions for implementing embodiments described herein. The NE 200 may also comprise electrical-to-optical (EO) components and optical-to-electrical (OE) components coupled to the ports 220 and Tx/Rx 210 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 232. The packet configuration module 233 is implemented by processor 230 to execute the instructions for implementing various embodiments discussed herein. For example, the packet configuration module 233 is configured to add the extension headers to the IPv4 packets, determine a starting point of an upper layer protocol header of an IPv4 packet based on a length of the extension headers, and process the IPv4 packet based on the control parameters included in the IPv4 header and the extension headers of the IPv4 packet. For example, the packet configuration module 233 is configured to control traffic along the path according to the parameters included in the IPv4 header and the extension headers. The inclusion of the packet configuration module 233 provides an improvement to the functionality of NE 200. The packet configuration module 233 also effects a transformation of NE 200 to a different state. Alternatively, the packet configuration module 233 is implemented as instructions stored in the memory 232.

The memory 232 comprises one or more of disks, tape drives, or solid-state drives and may be used as an over-flow data storage device, to store programs when such programs are selected for execution, and to store instructions and data that are read during program execution. The memory 232 may be volatile and non-volatile and may be read-only memory (ROM), random-access memory (RAM), ternary content-addressable memory (TCAM), and static random-access memory (SRAM).

It is understood that by programming and/or loading executable instructions onto the NE 200, at least one of the processor 230 and/or memory 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
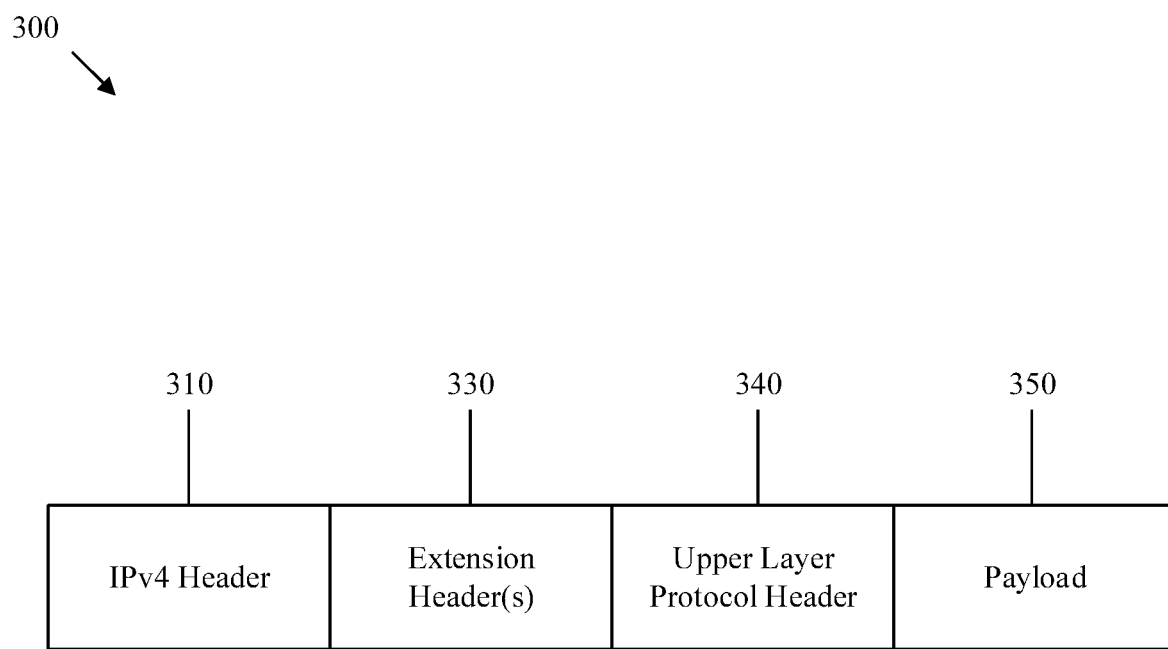
FIG. 3 is a packet diagram illustrating an IPv4 packet according to various embodiments of the present disclosure.

FIG. 3 is a diagram illustrating the contents of an IPv4 packet 300 according to various embodiments of the present disclosure. An IPv4 packet 300 may include an IPv4 header 310, one or more extension headers 330, an upper layer protocol header 340, and a payload 350. The IPv4 header 310 may be similar to the IPv4 header described by Internet Engineering Task Force (IETF) Request for Comments (RFC) 791 entitled "Internet Protocol," dated September 1981 (hereinafter referred to as RFC 791), which is hereby incorporated by reference in its entirety. However, a field in the IPv4 header 310 includes a protocol number, which identifies a type of extension header 330 that is included in the IPv4 packet 300, as will be further described below with reference to FIG. 4. One of the fields in the IPv4 header 310 is an options field that is configured to carry one or more options. An option includes information that may be used by the NEs 200 to determine how to direct or process an IPv4 packet. In some cases, an IPv4 packet 300 may not include any options in the optional field.

Various examples of the optional parameters that may be included in the options field and the structure of the options field are described in RFC 791. For example, some of the options included in the options field may be provisions for timestamps, security, a loose source route, a record route, a strict source route, a probe, a reply, etc. Other examples of options that may be included in the options field are described in IETF RFC 1063 entitled "IP MTU Discovery Options," dated July 1988, and IETF RFC 1385 entitled "EIP: The Extended Internet Protocol," dated November 1992, both of which are hereby incorporated by reference in their entireties.

The one or more extension headers 330 may be placed in the IPv4 packet 300 between the IPv4 header 310 and the upper layer protocol header 340. An extension header 330 may be further defined in IETF RFC 8200 entitled "Internet Protocol, version 6 (IPv6) specification," dated July 2017 (hereinafter referred to as RFC 8200), which is hereby incorporated by reference in its entirety. The extension headers 330 are optional and encoded in separate headers. For example, an IPv4 packet may carry zero or more extension headers, each of which are identified by a next header field in a preceding header, which will be further discussed below with reference to FIG. 4.

One example of an extension header 330 is a hop-by-hop extension header, which is examined or processed by any NE along an IPv4 packet's delivery path, until the IPv4 packet 300 reaches the NE 200 identified in the destination address field of the IPv4 header 310. Another example of an extension header 330 is a routing header, which lists one or more intermediate NEs 200 to be "visited" on the way to the NE 200 identified in the destination address field of the IPv4 header 310. Another example of an extension header is a fragment header, which is used to send a packet larger than would fit in the path. Various other examples of extension headers are defined in RFC 8200.

The upper layer protocol header 340 may be a header corresponding to a protocol that is used by the NEs 200 to filter and route traffic. For example, the upper layer protocol header 340 may be a TCP header, a UDP header, an IGMP header, an ICMP header, or an OSPF header based on the upper layer protocol implemented by the NEs 200 that are configured to forward the IPv4 packets.

In some embodiments, a NE 200 may be configured to encapsulate, or add, the upper layer protocol header 340, the extension headers 330, and the IPv4 header 310 onto the payload 350. When an NE 200 receives an IPv4 packet 300, the NE 200 may forward the IPv4 packet 300 based on the information in the options field of the IPv4 header 310 and the extension headers 330. In some embodiments, when the IPv4 packet 300 reaches the destination specified in the IPv4 header 310, the destination may identify where the data portion of the packet begins based on the length of the IPv4 header 310 and a variable length of the extension headers 330 included in the IPv4 packet 300. The fixed length of the IPv4 header 310 is included in a length field of the IPv4 header 310, as described below with reference to FIG. 4. In one embodiment, the length of the extension headers 330 may be included in the options field of the IPv4 header 310, as described below with reference to FIG. 5. In one embodiment, the length of the extension headers 330 may be included in one of the extension headers 330 included in the IPv4 packet 300, as described below with reference to FIG. 6.

Figure 4:
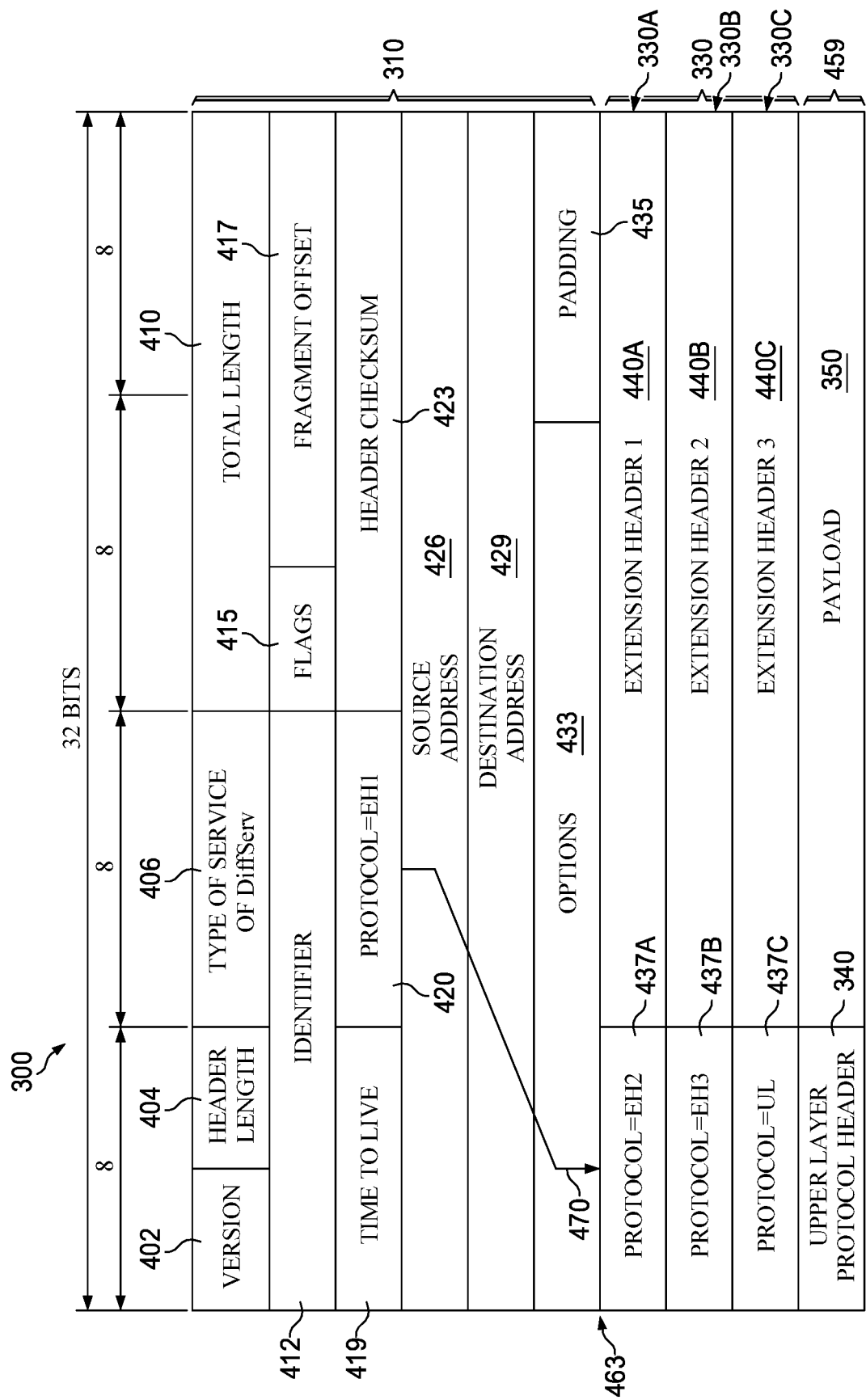
FIG. 4 is a type length value (TLV) diagram illustrating the contents of the IPv4 packet according various embodiments of the disclosure.

FIG. 4 is a TLV diagram illustrating the contents of the IPv4 packet 300 according various embodiments of the disclosure. As shown in FIG. 4, the IPv4 packet 300 includes the IPv4 header 310, the one or more extension headers 330, an upper layer protocol header 340, and a payload 350. The upper layer protocol header 340 and the payload 350 may be collectively referred to as the upper layer data 459. The IPv4 header 310 is similar to that described in RFC 790, except that one of the fields in the IPv4 header 310 includes a protocol number and a total length of the IPv4 packet 300 that is computed differently. For example, as shown in FIG. 4, the protocol field 420 of the IPv4 header 310 includes the protocol number that identifies a type of the first extension header 330A included in the IPv4 packet 300. The protocol number may be a value (also referred to herein as a next header value) that is assigned by the Internet Assigned Numbers Authority (IANA) that defines a type of extension header 330 included in the IPv4 packet 300. In some cases, the IANA may define new values to be the protocol numbers that define various different extension headers 330 that may be used for IPv4 packets 300 as disclosed herein. However, the IPv4 packets 300 may use the protocol numbers that are already defined for various existing extension headers 330, as shown in Table 1:

TABLE 1

IANA Defined Protocol Numbers or Next Header Values

| Protocol Number | Description |
| --- | --- |
| 0 | Hop-by-Hop Option |
| 43 | Routing Header |
| 44 | Fragment Header |
| 50 | Encapsulating Security Payload |
| 51 | Authentication Header |
| 60 | Destination Options |
| 135 | Mobility Header |
| 139 | Host Identity Protocol |
| 140 | Shim6 Protocol |
| 253 | Use for experimentation and testing |
| 254 | Use for experimentation and testing |

As shown by arrow 470, the protocol numbers carried by the protocol field 420 may identify a type of the first extension header 330A included in the IPv4 packet 300. The remaining fields of the IPv4 header 310 are similar to the fields of the IPv4 header described in RFC 791, except the total length field 410, which is further described below. The version field 402 is the first header field in the IPv4 packet 300 and is a four bit field indicating the format of the IPv4 header 310. The IPv4 packet 300 follows the IPv4, and thus this four bit field is set to 0100 to indicate IPv4. The header length field 404 is the second header field in the IPv4 packet 300 identifying the Internet header length (IHL), which is the number of 32 bit words in the header. Since an IPv4 header 300 may carry a variable number of options in the options field 433, this header length field 404 specifies the size of the IPv4 header 310. The type of service field 406 is used to carry information to provide quality of service features. For example, a type of service allows the selection of a delivery service in terms of precedence, throughput, delay, reliability, and monetary cost.

The total length field 410 is a 16 bit field that defines the entire size of the IPv4 packet 300. In the IPv4 header defined by RFC 791, the total length field 410 includes a summation of the header length of the IPv4 header 310 (the value carried by the header length field 404), a length of the upper layer data 459 (which includes a length of the upper layer protocol header 340 and a length of the payload 350). In embodiments of the present disclosure, the total length field 410 is a 16 bit field that includes a summation of the header length of the IPv4 header 310, a total length of all the extension headers 330 included in the IPv4 packet 300, and the length of the upper layer data 459. In some embodiments, the value included in the total length field 410 is used by NEs 200 and the destination host 150 of the IPv4 packet 300 to easily obtain the upper layer data 459 from the IPv4 packet 300.

The identifier field 412 is used for uniquely identifying fragments of an original IPv4 packet 300. The flags field 415 is a three bit field used to control or identify fragments. The fragment offset field 417 is measured in units of eight-byte blocks, and is 13 bits long. This field specifies the offset of a particular fragment relative to the beginning of the original unfragmented IPv4 packet 300. The time to live (TTL field) 419 is an 8 bit field that indicates the maximum time that the IPv4 packet 300 is allowed to remain in the network.

In the IPv4 packet defined by RFC 791, the protocol field 420 defines the IP protocol used in the data portion of the IPv4 packet 300, which corresponds to the type of upper layer protocol header 340 included in the IPv4 packet 300. The protocol is defined based on a list of IP protocol numbers assigned by the IANA. In embodiments of the present disclosure, the IP protocol number that defines the IP protocol used in the data portion of the IPv4 packet 300 is moved down to the next protocol number field 437C of the last extension header 330C included in the IPv4 packet 300, as will be further described below The header checksum field 423 is a 16 bit checksum field used for error-checking of the IPv4 header 310. The source address field 426 sets an IP address of the source host 145. The destination address field 429 sets an IP address of the destination host 150 of the IPv4 packet 300. As described above, the options field 433 includes options used to carry control information. The options field 433 may include zero or more options, where each option includes an options type field, a length field, and a data field that includes the parameters. Since there may be more than one option in the options field 433, a length of the options field 433 is variable. The maximum length of the options field 433 may be 40 bytes. In some cases, a padding field 435 may be included in the IPv4 header 310 to ensure that the header contains an integral number of 32-bit words.

As shown in FIG. 4, IPv4 packet 300 includes three extension headers 330A, 330B, and 330C placed in between the IPv4 header 310 and the upper layer protocol header 340. While the structure of the extension headers 330A-C are further described in FIG. 7, two fields in each of extension headers 330A-C is shown in FIG. 4. For example, the first extension header 330A includes a second protocol field 437A and a first extension header data field 440A, the second extension header 330B includes a third protocol field 437B and a second extension header data field 440B, and the third extension header 330C includes a fourth protocol field 437C and a third extension header data field 440C.

Each of these protocol fields 420 and 437A-C includes a protocol number that is used to signal the subsequent extension header 330 in the IPv4 packet 300 using a chaining mechanism. For example, as shown by arrow 470, the first protocol field 420 may include a protocol number that corresponds to a type of the first extension header data field 440A. For example, suppose the first extension header 330A is a hop-by-hop options header, which is identified by the protocol number of "43." In this case, the first protocol field 420 may include the value "0," and the first extension header data field 440A of the first extension header 330A may include fields similar to the hop-by-hop options header described in RFC 8200.

The second protocol field 437A of the extension header 330A may include a protocol number that corresponds to a type of the second extension header data field 440B. For example, suppose the second extension header 330B is a routing header, which is identified by the protocol number of "43." In this case, the second protocol field 437A may include the value "43," and the second extension header data field 440B of the second extension header 330B may include fields similar to the routing header described in RFC 8200.

The third protocol field 437B of the extension header 330B may include a protocol number that corresponds to a type of the third extension header data field 440C. For example, suppose the third extension header 330C is a fragment header, which is identified by the protocol number of "44." In this case, the third protocol field 437B may include the value "44," and the third extension header data field 440C of the third extension header 330C may include fields similar to the fragment header described in RFC 8200. In this way, each of the protocol fields 420 and 437A-C includes a protocol number that identifies a next extension header 330 included in the IPv4 packet 300.

In an embodiment, the NEs 200 on a path along which the IPv4 packet 300 is forwarded may be configured to obtain the upper layer data 459 of the IPv4 packet 300. The upper layer data 459 of the IPv4 packet 300 includes the information that may be used to forward and process the payload 350 of the IPv4 packet 300. In an embodiment, the NE 200 may be configured to determine a start point 460 of the upper layer data 459 based on a length of the IPv4 header 310 and a length of the one or more extension headers 330A-C included in the IPv4 packet 300. The length of the IPv4 header 310 is included in the header length field 404. In an embodiment, the length of the one or more extension headers 330A-C may be included as an option in the options field 433, as described below with reference to FIG. 5. In an embodiment, the length of the one or more extension headers 330A-C may be included as another extension header 330 of the IPv4 packet 300, as described below with reference to FIG. 6. A start point 463 of the IPv4 header 310 may come before the start point 460 of the upper layer data 459.

Figure 5:
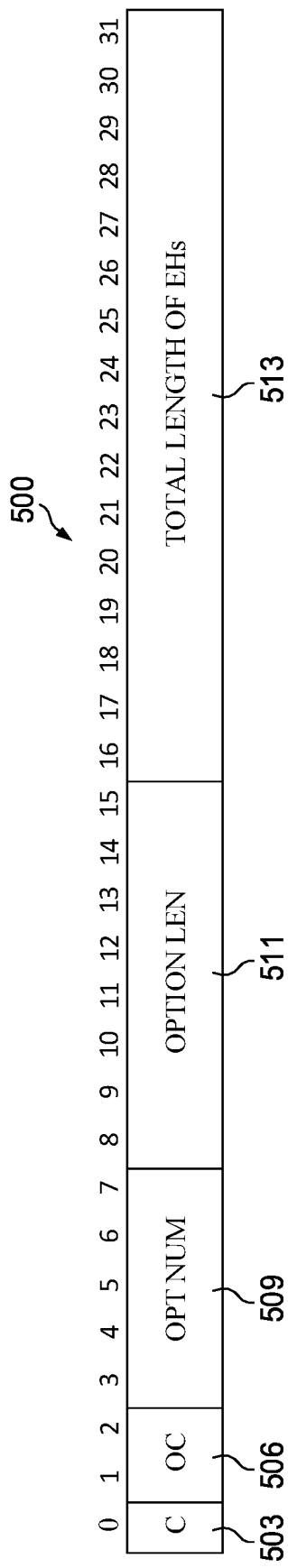
FIG. 5 is a TLV diagram illustrating an example of an option defining a total length of the one or more extension headers included in an IPv4 packet according to various embodiments of the disclosure.

FIG. 5 is a TLV diagram illustrating an example of an option 500 defining a total length of the one or more extension headers 330 included in an IPv4 packet 300 according to various embodiments of the disclosure. For example, the option 500 shown in FIG. 5 may be included in the option field 433 of the IPv4 packet 300. As shown in FIG. 5, the option 500 that defines a total length of the one or more extension headers 330 may include a copy flag 503, an option class field 506, an option number field 509, an option length field 511, and a total length field 513 of extension headers 330. The copy flag 503 is a one bit value that indicates whether the option 500 is to be copied into all the fragments of the IPv4 packet 300. The option class field 506 is a two bit field that is used for debugging purposes. The option number field 509 may be a value that identifies that option 500 includes a total length filed 513 of extension headers 330. In some embodiments, this value may be set by the IANA. The option length field 511 indicates the length of the option 500, which is four bytes.

The total length field 513 indicates the total length of all the extension headers 330 included in the IPv4 packet 300. Each of the extension headers 330 has a variable length, and each extension header 330 may have a length field that identifies a length of that particular extension header 330. In this way, a length of each of the extensions headers 330 included in an IPv4 packet 300 may be summed together to obtain the total length of extension headers 330. Therefore, the total length of all the extension headers 330 may vary between IPv4 packets 300 based a length of each of the extension headers 330 included in each of the IPv4 packets 300.

Figure 6:
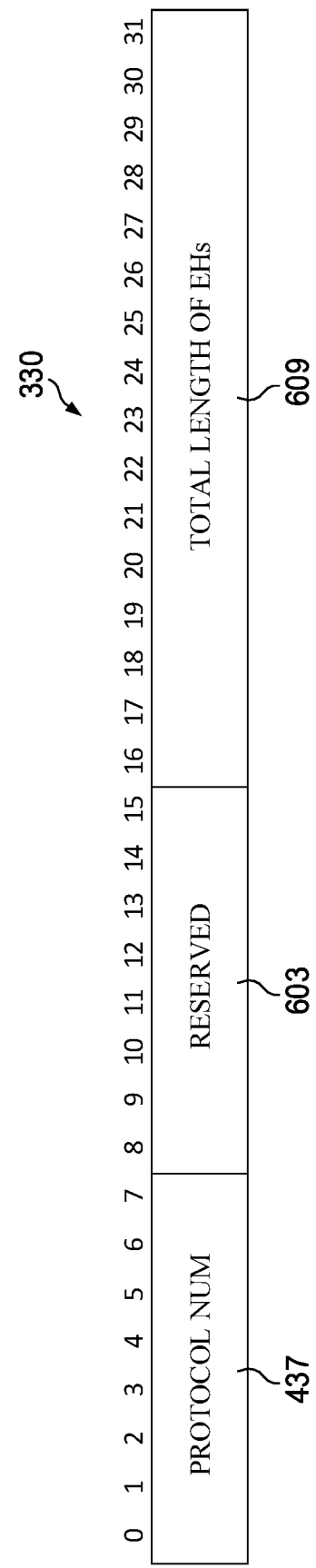
FIG. 6 is a TLV diagram illustrating an example of an extension header defining a total length of the one or more extension headers included in an IPv4 packet according to various embodiments of the disclosure.

FIG. 6 is a TLV diagram illustrating an example of an extension header 330 defining a total length of the one or more extension headers 330 included in an IPv4 packet 300 according to various embodiments of the disclosure. As shown in FIG. 6, the extension header 330 includes a protocol number field 437, a reserved field 603, and a total length field 609 of extension headers 330 included in the IPv4 packet 300. The protocol number field 437 may include a protocol number that identifies a next extension header 330 included in the IPv4 packet 300. The reserved field 603 may be eight bits that are reserved for future use. The total length field 609 includes a total length of extension headers 330 included in the IPv4 packet 300. This total length of extension headers 330 may be a summation of a length of each of the extension headers 330 included in the IPv4 packet 300 including a length of this extension header 330 shown in FIG. 6.

In an embodiment, the extension header 330 may be the first extension header 330 included in an IPv4 packet 300 such that NEs 200 are configured to determine the total length of the extension headers 330 by accessing the first extension header 330A of an IPv4 packet. However, it should be appreciated that the extension header 330A may be a first, intermediate, or last extension header 330 included in an IPv4 packet.

In some embodiments, an NE 200 or a destination host 150 may be configured to obtain the upper layer data 459 from the IPv4 packet 300. The total length of the extension headers 330 may be used in addition to the header length of the IPv4 header 310 to obtain a start point 460 of the upper layer data 459. The start point 460 of the upper layer data 459 may be determined based on a length of the IPv4 header 310 and a total length of the extension headers 330 in the IPv4 packet 300. In one embodiment, a length of the IPv4 header 310 may be obtained from the header length field 404. In one embodiment, a total length of the one or more extension headers 330 included in the IPv4 packet 300 may be obtained from the options field 433 when the options field includes the option 500 shown in FIG. 5. In one embodiment, a total length of the one or more extension headers 330 included in the IPv4 packet 300 may be obtained from an extension header 330 when the IPv4 packet 300 includes the extension header 330 shown in FIG. 6. In some embodiments, the units of each of these lengths may be the same to ensure the proper calculations are performed. For example, the unit of the length of the IPv4 header 310 that is carried by the header length field 404 may be different from the unit of the length carried in the total length field 410 or the unit of the total length of the extension headers 330 carried in the option 500 or the extension header 330 shown in FIG. 6. Therefore, the length of the IPv4 header 310 carried by the header length field 404 may be multiplied by four before being added or subtracted from one of the equations described above.

In one embodiment, a start point 460 of the upper layer data 459 is computed by first determining a start point 463 of the IPv4 header 310, adding the length of the IPv4 header 310 to the start point 463, and then adding the total length of the extension headers 330 to both the start point 463 and the length of the IPv4 header 310. In this way, the start point 460 of the upper layer data 459 may also be determined by subtracting the sum of the length of the IPv4 header 310 and the total length of the extension headers 330 from the total length of the IPv4 packet, which may be included in the total length field 410 of the IPv4 packet 300.

In some embodiments, an NE 200 along a path of the IPv4 packet or the destination host 150 of the IPv4 packet may be configured to determine the start point 460 of the upper layer data 459 based on the computations described above. In this way, the NE 200 or the destination host 150 does not have to traverse the entire IPv4 packet 300 to determine the start point 460 of the upper layer data 459. Instead, the NE 200 or the destination host 150 performs these calculations using the embodiments of transmitting the total length of the extension headers 330 as described herein to determine the start point 460 of the upper layer data 459.

Figure 7:
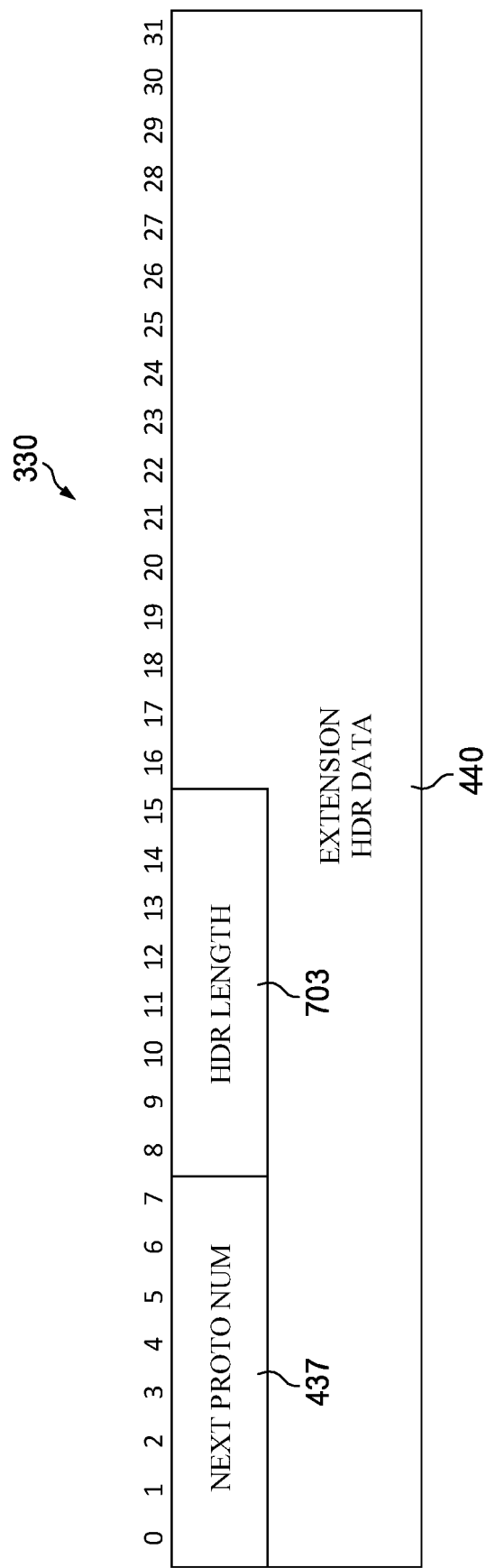
FIG. 7 is a TLV diagram illustrating an example of an extension header according to various embodiments of the disclosure.

FIG. 7 is a TLV diagram illustrating an example of an extension header 330 according to various embodiments of the disclosure. Unlike the extension 330 shown in FIG. 6, the extension header 330 shown in FIG. 7 does not contain a total length of the extension headers 330. The extension header 330 shown in FIG. 7 is a general form of an extension header 330 that may carry information that is used by NEs 200 on a path or a destination to process the IPv4 packet. As shown in FIG. 7, the extension header 330 includes a protocol number field 437, a header length field 703, and an extension header data field 440. The protocol number field 437 includes a protocol number that identifies a next extension header 330 included in the IPv4 packet 300.

The header length field 703 may be an 8 bit field that identifies the length of the current extension header 330. For example, in extension header 330A, the next protocol number field 437A identifies the type of the extension header 330B, and the header length field 703 identifies a length of the extension header data field 440A. The header length field 703 may include a value representing a length of the current extension header 330 in four octet units, not including the first four octets. For example, the length that is included in the header length field 703 may be equal to a total length of the extension header deducting four. The total length of the extension header is a summation of a length of the next protocol number field 437A (one octet), a length of the header length field 703 (one octet), and a length of the extension header data field 440. In this way, when the length in the header length field 703 is set to 0, the actual length of the extension header is four octets. The extension header data field 440 includes the actual extension header data that is used by NEs 200 and destinations to process the IPv4 packet. In an embodiment, one or more Os may be added to the end of the extension header data field 440 when the extension header data field 440 is not a multiple of four octets.

Figure 8:
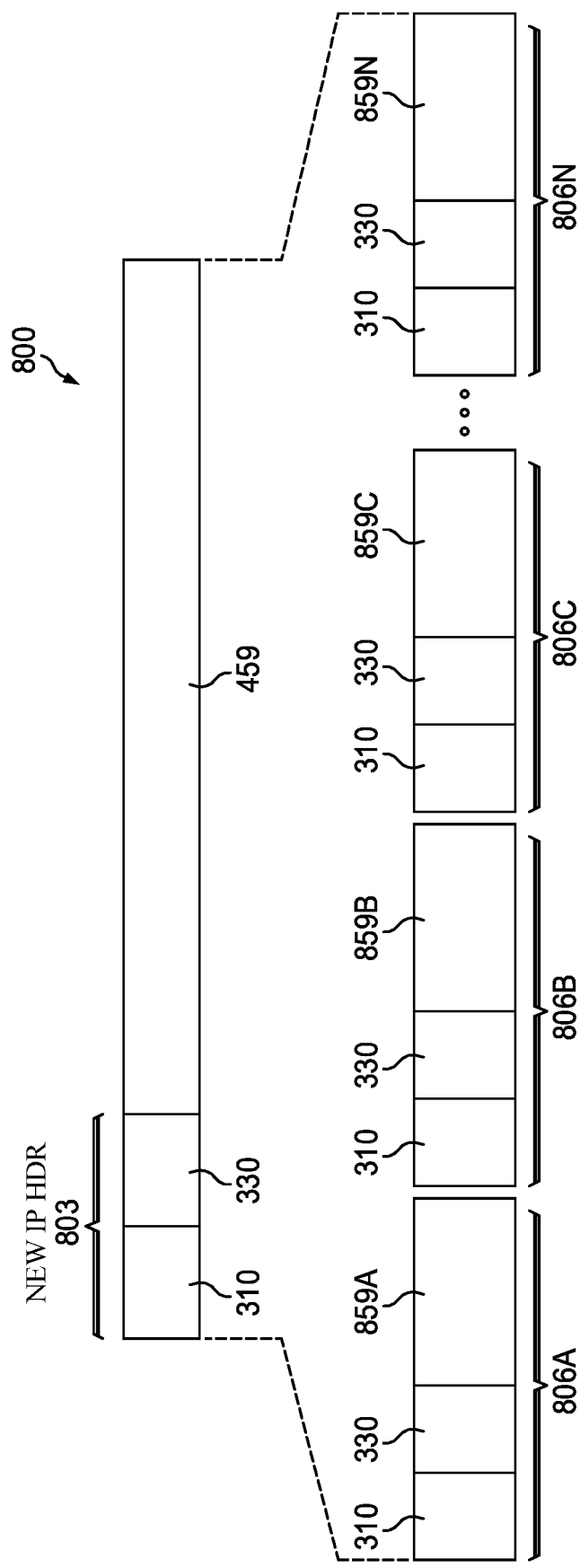
FIG. 8 is a diagram illustrating a fragmentation scheme of IPv4 packets including extension headers according to various embodiments of the disclosure.

FIG. 8 is a diagram illustrating a fragmentation scheme 800 of IPv4 packets 300 including extension headers 330 according to various embodiments of the disclosure. Fragmentation is an IP process that breaks IPv4 packets 300 (or datagrams) into smaller pieces, or fragments 806, so that the IPv4 packets 300 that pass through a link with a smaller maximum transmission unit (MTU) than the original IPv4 packet 300 size can be formed. An MTU is a maximum length of a fragment 806 that can be forwarded along a link to a network. Fragmentation is further described in RFC 791. The fragmentation scheme 800 is different from the fragmentation scheme described in RFC 791 because the fragmentation scheme defined in RFC 791 does not take into account the presence of extension headers 330 in the IPv4 packets 300 that are fragmented.

In the fragmentation scheme 800, IPv4 packets 300 including extension headers 330 are fragmented into a plurality of smaller IPv4 packets 300, referred to in FIG. 8 as fragments 806A-N. As shown in FIG. 8, the IPv4 packet 300 includes the IPv4 header 310, one or more extension headers 330, and the upper layer data 459. The combination of the IPv4 header 310 and the one or more extension headers 330 may be referred to here as the IP header 803. According to an embodiment of the fragmentation scheme 800, the IPv4 packet 300 is divided into multiple fragments 806A-N, where N may be a positive integer. Therefore, while only four fragments are shown in FIG. 8, the IPv4 packet 300 may be divided into any number of fragments.

In an embodiment, each fragment 806 includes the IPv4 header 310, the extension headers 330, and a fragment of the upper layer data 459 of the IPv4 packet 300. As shown in FIG. 8, fragment 806A includes the IPv4 header 310, the one or more extension headers 330 included in the IPv4 packet 300, and a fragment 859A of the upper layer data 459. Fragment 806B includes the IPv4 header 310, the one or more extension headers 330 included in the IPv4 packet 300, and a fragment 859B of the upper layer data 459. Fragment 806C includes the IPv4 header 310, the one or more extension headers 330 included in the IPv4 packet 300, and a fragment 859C of the upper layer data 459. Fragment 806N includes the IPv4 header 310, the one or more extension headers 330 included in the IPv4 packet 300, and a fragment 859N of the upper layer data 459.

In an embodiment, each fragment 806 has the IP header 803 that includes the original IPv4 header 310 and the extension headers 330 of the IPv4 packet 310, but includes a different fragment 859 of the upper layer data 459. In one embodiment, the upper layer data 459 may include the payload 350 of the IPv4 packet 300. In this embodiment, the payload 350 is fragmented into each of the MTUs, and each fragment 806 has the new IP header 803 and the upper layer protocol header 340.

In some embodiments, each fragment 806 includes the same fields as the IPv4 header 310, extension headers 330, and the upper layer protocol header 340 and includes new values for the following four fields in the IPv4 header 310: the total length field 410, the flags field 415, a fragmentation offset field 417, and a header checksum field 423. The total length field 410 included in the IPv4 header 310 for a fragment 806 includes a length of the fragment 806. This length may be equal to the MTU, except for in the last fragment 806N. The last fragment 806N may include a length that is less than the MTU. The flags field 415 may be updated to indicate whether the fragment 806 is the last fragment or whether there are more fragments 806, as described in RFC 791. The fragment offset field 417 may indicate where in the IPv4 packet 300 that the fragment 806 belongs. The header checksum field 423 is used for debugging purposes since some header fields in the IPv4 header 310 change during transmission along the hops of a path.

In an embodiment, the NE 200 may be configured to add the IPv4 header 310, the one or more extension headers 330, and the upper layer protocol header 340 to the payload 350. For example, the source PE NE 106 may be configured to add the IPv4 header 310, the one or more extension headers 330, and the upper layer protocol header 340 to the payload 350. In an embodiment, the NE 200 that adds the IPv4 header 310, the extension headers 330, and/or the upper layer protocol header 340 may also be configured to perform fragmentation of the IPv4 packet 300 according the fragmentation scheme 800. In an embodiment, performing fragmentation of the IPv4 packet 300 according to the fragmentation scheme 800 refers to dividing the IPv4 packet 310 into a plurality of fragments 806, where each fragment 806 includes the IP header 803 and the fragment 859 of the upper layer data 459, and where the values for the total length field 410, the flags field 415, a fragmentation offset field 417, and a header checksum field 423 are updated for the fragment 806. In one embodiment, NE 200 performs fragmentation of the IPv4 packet 300 based on the flags set in the flags field 415 of the IPv4 packet 300.

The fragmentation scheme 800 is performed such that the reassembly of the fragments 806 may be performed by the NE 200 that is attached to the destination host 150. For example, CE NE 108 may perform reassembly of the fragments 806 when the destination host 150 is attached to the CE NE 108. In some embodiments, reassembly of the fragments 806 may be performed in a manner similar to that described in RFC 791, except that the fragments 806 are reassembled to include the extension headers 330. In some embodiments, each fragment 806 comprises an identification field that is used to distinguish the fragments 806 of one IPv4 packet 300 from another such that NEs 200 or the destination host 150 may reassemble the fragments 806 according to the value in the identification field. For example, the NE 200 attached to the destination host 150 or the destination host 150 itself may be configured to reassemble the fragments 806 that have the same value for the identification field 412, source address field 426, destination address field 429, and protocol field 420.

FIG. 9 shows an example of calculations 900 used to determine a fragment offset that may be included in an IPv4 header 310 for each of the fragments 806 according to various embodiments of the disclosure. As shown in FIG. 9, box 903 defines the acronyms used in the calculations shown in box 906 and 909. In box 906, an embodiment for determining a length of the upper layer data 459 is shown, and an embodiment for determining a length of the fragment 859 of the upper layer data 459 in each of the fragments 806 is shown. In box 906, an embodiment for determining a total number of fragments 806 for an IPv4 packet 300 is also shown. In box 909, an embodiment for calculating a total length of each of the fragments 806, more fragments (MF_bit), and fragment offset of each of the fragments 806 is shown. In one embodiment, the total length determined using these calculations may be included in the total length field 410 for each of the fragments 806.

FIG. 10 is a flowchart illustrating a method 1000 for processing an IPv4 packet 300 with extension headers 330 according to various embodiments of the disclosure. Method 1000 may be implemented by NEs 102, 104, 106, 107, 108, 114, or 200. Method 1000 may be implemented when an NE 200 receives an IPv4 packet 300. At step 1003, an IPv4 packet 300 may be received from another NE 200. For example, Tx/Rx 210 receives the IPv4 packet 300 from another NE 200. In an embodiment, the IPv4 packet 300 comprises an IPv4 header 310, one or more extension headers 330, and upper layer data 459. In an embodiment, the IPv4 header 310 comprises a protocol number associated with the extension header 330. In an embodiment, the options field 433 or an extension header 330 carries a total length of the extension header(s) 330. At step 1006, the IPv4 packet 300 is processed based on the total length of the extension header 330. For example, the packet configuration module 233, which is executed by the processor 230, may be configured to process the IPv4 packet 300 based on the total length of the extension header 330.

FIG. 11 is a flowchart illustrating a method 1100 for generating an IPv4 packet 300 with extension headers 330 according to various embodiments of the disclosure. Method 1100 may be implemented by NEs 102, 104, 106, 107, 108, 114, or 200. Method 1100 may be implemented when an NE 200 receives a payload 350 from a source host 145. At step 1103, an IPv4 packet 300 is obtained. For example, the packet configuration module 233 executed by the processor 230 generates the IPv4 packet 300. In an embodiment, the IPv4 packet 300 comprises an IPv4 header 310, one or more extension headers 330, and upper layer data 459. In an embodiment, the IPv4 header 310 comprises a protocol number associated with the first extension header 330. In an embodiment, the options field 433 or an extension header 330 carries a total length of the extension header(s) 330. At step 1106, the IPv4 packet 300 is transmitted to another NE 200. For example, the Tx/Rx 210 transmits the IPv4 packet 300 to another NE 200.

FIG. 12 is a flowchart illustrating a method 1200 for forwarding an IPv4 packet 300 with extension headers 330 according to various embodiments of the disclosure. Method 1200 may be implemented by NEs 102, 104, 106, 107, 108, 114, or 200. Method 1200 may be implemented when an NE 200 receives an IPv4 packet 300. At step 1103, an IPv4 packet 300 is received. For example, Tx/Rx 210 receives the IPv4 packet 300. In an embodiment, the IPv4 packet 300 comprises an IPv4 header 310, one or more extension headers 330, and upper layer data 459. In an embodiment, the IPv4 header 310 comprises a protocol number associated with the extension header 330. In an embodiment, the options field 433 or an extension header 330 carries a total length of the extension header(s) 330. At step 1206, the IPv4 packet 300 is transmitted to another NE 200. For example, the Tx/Rx 210 transmits the IPv4 packet 300 to another NE 200.

In an embodiment, the disclosure includes a means for [this will be completed upon completion of the claims.]

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE), comprising:
   receiving, by a receiver of the NE, an Internet Protocol (IP) version 4 (IPv4) packet from another NE, wherein the IPv4 packet comprises an IPv4 header, a plurality of extension headers, and upper layer data, wherein the IPv4 header comprises a first protocol field and a total length field, wherein the first protocol field indicates a protocol number associated with a first extension header of the plurality of extension headers, wherein the total length field indicates a total length of the IPv4 packet, and wherein the IPv4 packet comprises a field indicating a length of the plurality of extension headers;
   determining, by a processor coupled to the receiver, a protocol used to encode the upper layer data of the IPv4 packet based on a value indicated in a last protocol field of a last extension header of the plurality of extension headers; and
   processing, by a processor coupled to the receiver, the IPv4 packet based on the length of the plurality of extension headers, the total length of the IPv4 packet, and the protocol used to encode the upper layer data of the IPv4 packet.

2. The method of claim 1, wherein the IPv4 packet further comprises a payload.

3. The method of claim 1, wherein processing, by the processor, the IPv4 packet further comprises determining a start point of the upper layer data of the IPv4 packet based on the total length of the IPv4 header and the length of the plurality of extension headers, wherein the upper layer data comprises an upper layer protocol header and a payload.

4. The method of claim 1, wherein each of the plurality of extension headers comprises a protocol number for a next extension header.

5. The method of claim 1, wherein each of the plurality of extension headers is at least one of a hop-by-hop extension header or a destination extension header.

6. The method of claim 1, wherein an options field of the IPv4 header comprises the length of the plurality of extension headers.

7. The method of claim 1, wherein one of the plurality of extension headers comprises the length of the plurality of extension headers.

8. A network element (NE), comprising:
a memory storage comprising instructions; and
one or more processors in communication with the memory storage, wherein the one or more processors execute the instructions to:
obtain an Internet Protocol (IP) version 4 (IPv4) packet, wherein the IPv4 packet comprises an IPv4 header, a plurality of extension headers, and upper layer data, wherein the IPv4 header comprises a first protocol field and a total length field, wherein the first protocol field indicates a protocol number associated with a first extension header of the plurality of extension headers, wherein the total length field indicates a total length of the IPv4 packet, and wherein the IPv4 packet comprises a field indicating a length of the plurality of extension headers;
determine a protocol used to encode the upper layer data of the IPv4 packet based on a value indicated in a last protocol field of a last extension header of the plurality of extension headers; and
transmit the IPv4 packet to another NE.

9. The NE of claim 8, wherein the one or more processors execute the instructions to encapsulate the IPv4 packet to include the IPv4 header and the plurality of extension headers, and wherein the IPv4 packet further comprises a payload.

10. The NE of claim 8, wherein the protocol number associated with the first extension header identifies a type of the first extension header.

11. The NE of claim 8, wherein the first extension header comprises a second protocol number associated with a second extension header of the plurality of extension headers.

12. The NE of claim 8, wherein an options field of the IPv4 header comprises the length of the plurality of extension headers.

13. The NE of claim 8, wherein the first extension header comprises the length of the plurality of extension headers.

14. A network element (NE), comprising:
a receiver configured to receive an Internet Protocol (IP) version 4 (IPv4) packet, wherein the IPv4 packet comprises an IPv4 header, a plurality of extension headers, and upper layer data, wherein the IPv4 header comprises a first protocol field and a length field, wherein the first protocol field indicates a protocol number associated with a first extension header, wherein the total length field indicates a total length of the IPv4 packet, and wherein the IPv4 packet comprises a field indicating a length of the plurality of extension headers;
a processor coupled to the receiver and configured to determine a protocol used to encode the upper layer data of the IPv4 packet based on a value indicated in a last protocol field of a last extension header of the plurality of extension headers; and
a transmitter coupled to the processor and configured to transmit the IPv4 packet to another NE.

15. The NE of claim 14, wherein the protocol number identifies a type of the extension header.

16. The NE of claim 14, wherein each of the extension headers comprises a protocol number for a next extension header.

17. The NE of claim 14, wherein an options field of the IPv4 header comprises the length of the plurality of extension headers.

18. The NE of claim 14, wherein one of the extension headers included in the IPv4 packet comprises the length of the plurality of extension headers.

* * * * *

UNITED STATES PATENT AND TRADEMARK OFFICE
CERTIFICATE OF CORRECTION

PATENT NO. : 10,742,775 B2
APPLICATION NO. : 15/983670
DATED : August 11, 2020
INVENTOR(S) : Lin Han Page 1 of 1

It is certified that error appears in the above-identified patent and that said Letters Patent is hereby corrected as shown below:

On the Title Page

Page 2, Second Column, Lines 3-4, should read:
"Internet Protocol, DARPA Internet Program Protocol Specification," RFC 791, Sep. 1981, 50 pages.

In the Specification

Column 1, Lines 7-11, should read:
The present application claims benefit of U.S. Provisional Patent Application No. 62/531,240 filed Jul. 11, 2017 by Lin Han, and entitled "Supporting Internet Protocol Version 4 (IPv4) Extension Headers," which is incorporated herein by reference as if reproduced in its entirety.

In the Claims

Column 18, Lines 12-29, Claim 14, should read:
14. A network element (NE), comprising:
 a receiver configured to receive an Internet Protocol (IP) version 4 (IPv4) packet, wherein the IPv4 packet comprises an IPv4 header, a plurality of extension headers, and upper layer data, wherein the IPv4 header comprises a first protocol field and a total length field, wherein the first protocol field indicates a protocol number associated with a first extension header, wherein the total length field indicates a total length of the IPv4 packet, and wherein the IPv4 packet comprises a field indicating a length of the plurality of extension headers;
 a processor coupled to the receiver and configured to determine a protocol used to encode the upper layer data of the IPv4 packet based on a value indicated in a last protocol field of a last extension header of the plurality of extension headers; and
 a transmitter coupled to the processor and configured to transmit the IPv4 packet to another NE.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*